United States Patent
Huang

(10) Patent No.: US 6,630,773 B1
(45) Date of Patent: Oct. 7, 2003

(54) ASSEMBLING STRUCTURE FOR LAMP STRING WITH FULLY ENVELOPED BULBS

(75) Inventor: Peter K. H. Huang, Taipei (TW)

(73) Assignee: Shining Blick Enterprises Co., Ltd., Taipei (TW)

( * ) Notice: Subject to any disclaimer, the term of this patent is extended or adjusted under 35 U.S.C. 154(b) by 0 days.

(21) Appl. No.: 09/461,351

(22) Filed: Dec. 15, 1999

(51) Int. Cl.⁷ ............................... H01J 5/48; H01J 5/50
(52) U.S. Cl. ............. 313/318.02; 313/317; 313/318.09; 362/236; 362/237; 362/267; 362/353; 439/611; 439/612
(58) Field of Search .......................... 313/317, 318.01, 313/318.02, 318.03, 318.04, 318.05, 318.09; 362/226, 249, 252, 236, 237, 267, 310, 311, 353, 351; 439/611, 612

(56) References Cited

U.S. PATENT DOCUMENTS

| | | | | |
|---|---|---|---|---|
| 3,604,918 A | * | 9/1971 | Cook et al. ................. 362/311 |
| 5,012,397 A | * | 4/1991 | Tseng ......................... 362/237 |
| 5,192,127 A | * | 3/1993 | Schaef ....................... 362/226 |
| 5,221,140 A | * | 6/1993 | Oshino ................... 313/318.01 |
| 5,498,922 A | * | 3/1996 | Chang ................... 313/318.09 |
| 5,504,397 A | * | 4/1996 | Chien ........................... 248/51 |
| 5,517,394 A | * | 5/1996 | Lin ............................. 362/353 |
| 5,626,415 A | * | 5/1997 | Huang ......................... 362/226 |
| 5,800,047 A | * | 9/1998 | Yang ...................... 313/318.01 |
| 5,810,621 A | * | 9/1998 | Tsai ....................... 313/318.01 |
| 5,931,568 A | * | 8/1999 | Chuang ...................... 362/122 |
| 6,086,225 A | * | 7/2000 | Kahl et al. ............. 313/318.01 |
| 6,155,695 A | * | 12/2000 | Sealy ......................... 362/237 |

* cited by examiner

*Primary Examiner*—Nimeshkumar D. Patel
*Assistant Examiner*—Sikha Roy
(74) *Attorney, Agent, or Firm*—Troxell Law Office PLLC

(57) ABSTRACT

A structure of fully enveloped miniature lamp bulb for lamp strings suitable for mass production and having any of varied appearances is disclosed. The lamp bulb has two electrode pins with a predetermined distance therebetween and being connected in the glass body thereof to a light emitting tungsten filament, parts of the electrode pins are extended out of the bottom of the glass body for connecting to a conductor pair. A transparent cover having any of various kinds of modeling which are made separately with dies is provided with an assembling hole of a size mating with that of the lamp bulb and extending inwardly for a suitable depth from an end thereof; the miniature lamp bulb connected with the conductors is placed in the assembling hole by assistance of a positioning block, the connecting area is sealed with adhesive agent to complete assembling of the structure.

4 Claims, 10 Drawing Sheets

ASSEMBLING STRUCTURE FOR LAMP
STRING WITH FULLY ENVELOPED BULBS

BACKGROUND OF THE INVENTION

1. Field of the Invention

The present invention is related to a structure of fully enveloped miniature lamp bulb for lamp strings, and especially to such a structure capable of rendering assembling, shaping and mass production of miniature lamp bulbs more convenient and faster, and making appearance of them more variant.

Such a fully enveloped miniature lamp bulb of the present invention is directed to a miniature decorative lamp bulb which is not yet inserted into a lamp receptacle but has its electrode pins exposed to connect conductors directly for lightening or flashing.

2. Description of the Prior Art

In a conventional miniature lamp bulb, as shown in FIG. 1, when assembling in a factory, an exterior heat-shrinking pipe 12 is fixed on the joint of a miniature lamp bulb 10 and a pair of conductors 11. Process for assembling the interiors of the miniature lamp bulb 10 includes welding between the electrode pins and the conductors 11, and injection of adhesive anget after an inner plastic pipe is slipped over thereon, then the exterior heat-shrinking pipe 12 is fixed by way of heat shrinking. Such process of assembling not only is time consuming and cumbersome, but also is slow in processing which does not meet the requirement of mass production. Moreover, the exterior heat-shrinking pipe 12 fixed on the area between the soft miniature lamp bulb 10 and the conductors 11 by heat shrinking often makes uneven shrinkage and results ugly appearance on the whole product.

In view of this, an improvement as shown in FIG. 2 has been proposed, wherein, a miniature lamp bulb 13 is connected with a pair of conductors 14, a positioning block 15 is interposed between the conductors 14 at the joint of the lamp bulb 13 and the conductors 14. They are wholly placed in a die to be injection enveloped with a transparent cover 16. The advantage of such design is that, after assembling of the lamp bulb 13 with the conductors 14, appearance on the whole product can be neater and good-looking. And their assembling and enveloping can be done in the die, hence speed of processing is evidently faster. However, this measures is disadvantageous in that, the miniature lamp bulb and part of the conductors must be placed in the die to be injection enveloped. In production, the sequential injection and envelopment can not be proceeded until completing the primary assembling of the lamp bulb with the conductors into a semi product. According to the molding technique available now, such shaping method by injection and envelopment can only have limited amount of products completed each time. And by influence of the die for injection and envelopment, modeling of the transparent cover is limited and hardly changeable.

SUMMARY OF THE INVENTION

The object of the present invention is to provide a structure of fully enveloped miniature lamp bulb for lamp strings, with which, a plastic die is used in the first place to give a transparent cover with a desired contour. The transparent cover is provided with an assembling hole extending inwardly for a suitable depth from one end thereof and with a diameter coincident with that of the miniature lamp bulb. A positioning block is interposed between the conductors at the joint of the lamp bulb and the conductors for supporting the bottom of the miniature lamp bulb and leading the conductors to be connected. The assembled members as a whole then are placed in the assembling hole, PVC is well filled from the bottom of the assembling hole to complete assembling of the miniature lamp bulb.

The aforesaid transparent cover can be formed with a normal plastic die, thereby mass production can be even much faster and more convenient.

In the process of production in a factory, connecting of the miniature lamp bulb with the conductors and injection shaping of the transparent cover can be separately but synchronically proceeded to increase speed of production.

The contour of the transparent cover can be conveniently of any of various shapes, so that modeling of the transparent cover is varied.

The transparent cover can more suit the light converging surface provided at the location where the miniature lamp bulb locates to increase decorative effect.

The present invention will be apparent in its novelty and features after reading the detailed description of the preferred embodiment thereof in reference to the accompanying drawings.

DETAILED DESCRIPTION OF THE PREFERRED EMBODIMENT

Figure 1:
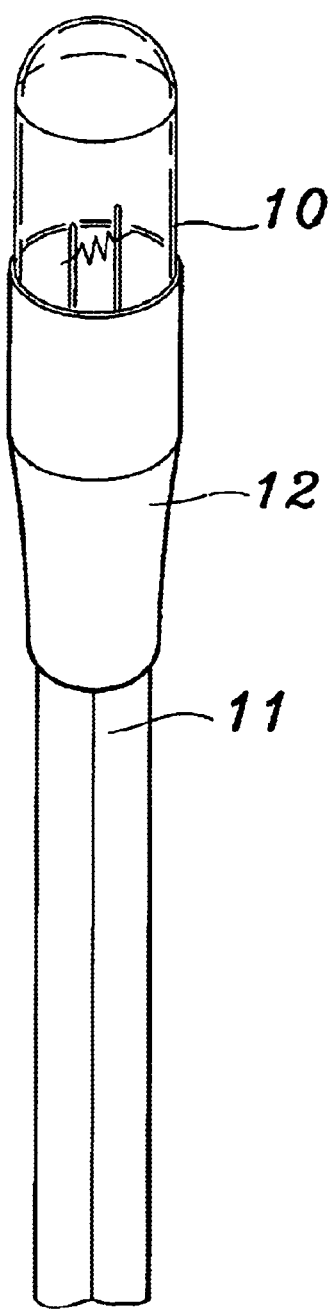
FIG. 1 is a perspective view showing the structure of a conventional miniature lamp bulb in assembling with a pair of conductors.
Figure 2:
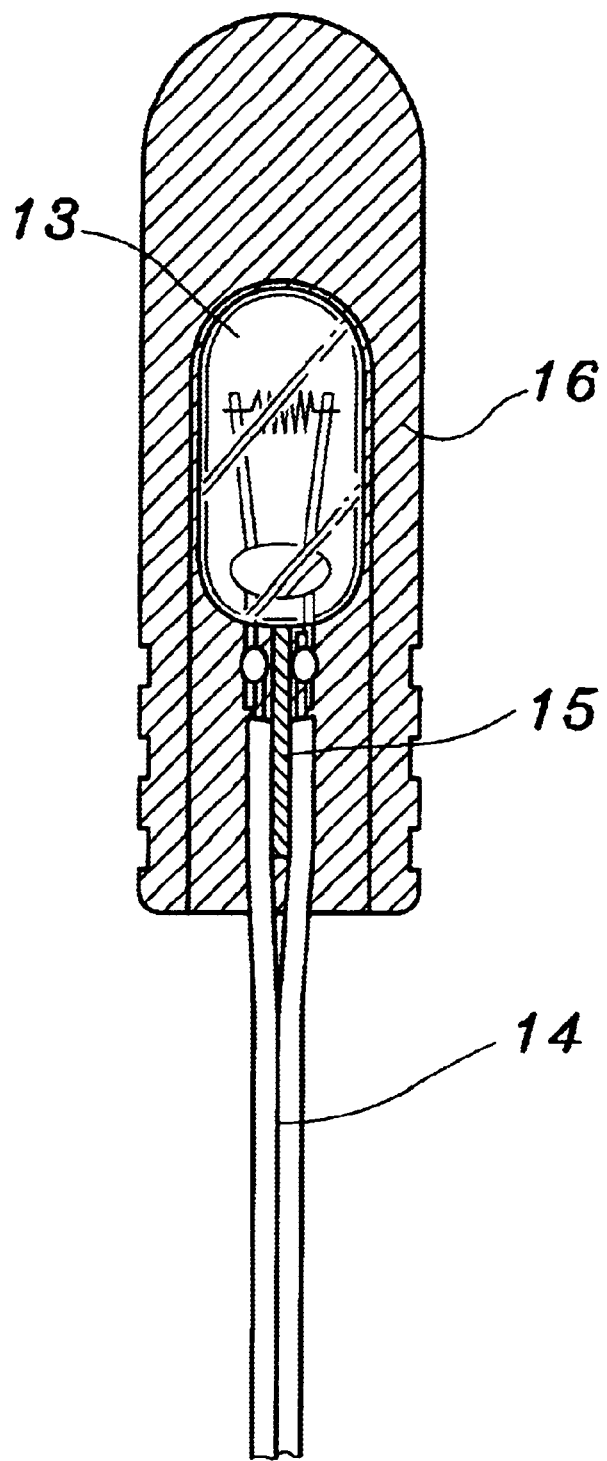
FIG. 2 is a sectional view showing the structure of another known miniature lamp bulb and its conductors enveloped with a cover by injection.
Figure 3:
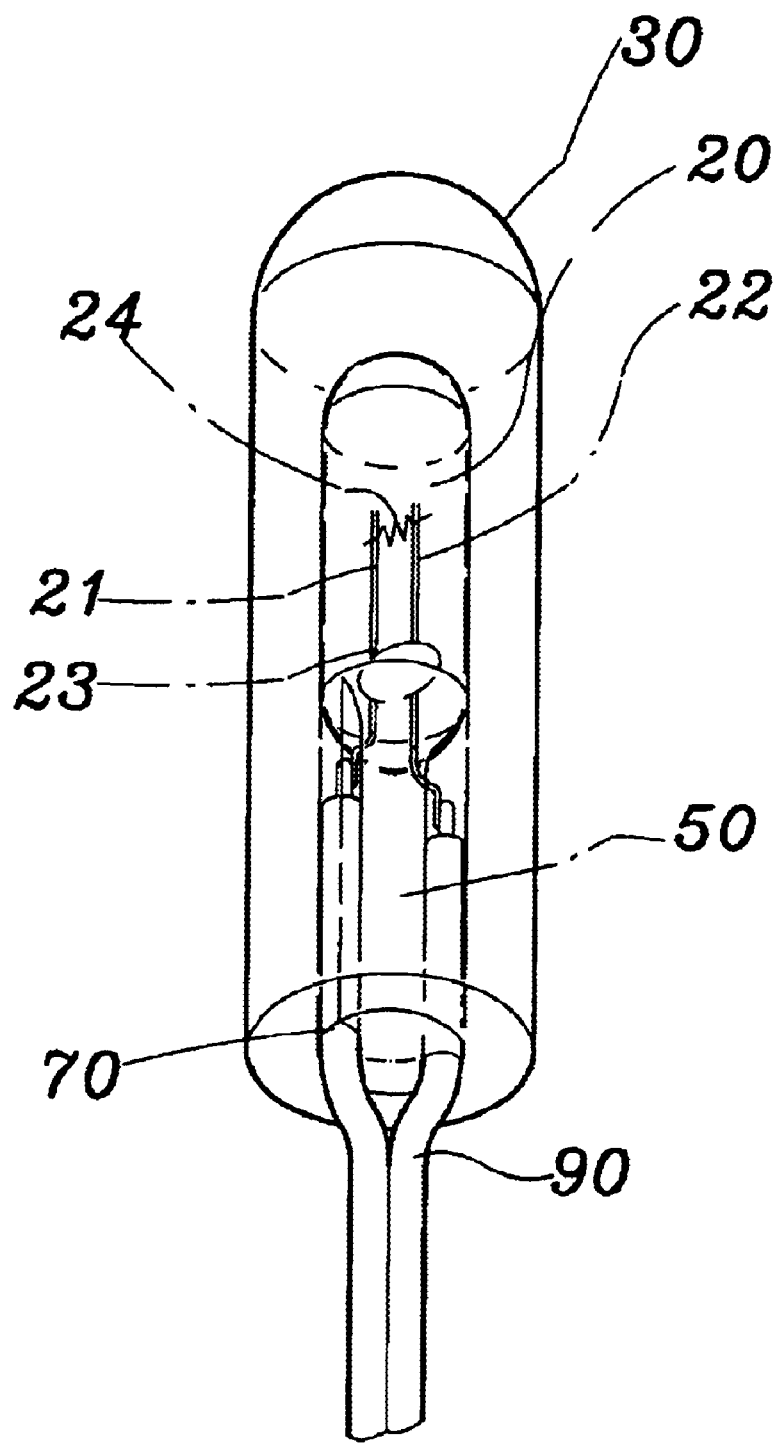
FIG. 3 is a perspective view of a preferred embodiment of the present invention.
Figure 4:
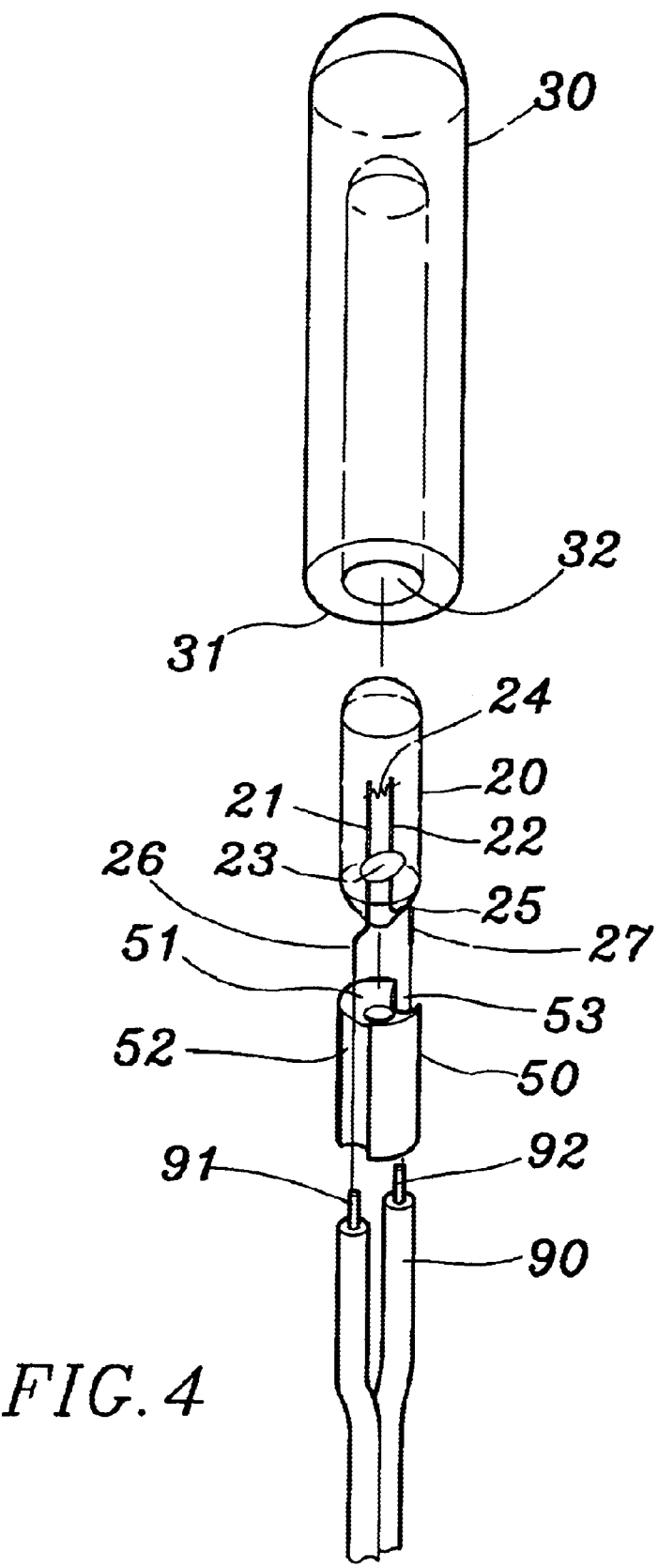
FIG. 4 is an analytic perspective view showing the elements before assembling of the transparent cover, the miniature lamp bulb and the conductors.

Referring to FIGS. 3 and 4, take the miniature lamp bulb 20 shown in this drawing as an example, it is still made of glass, and is provided with two electrode pins 21, 22. The electrode pins 21, 22 are spaced away a distance in pursuance of the size of an internal bead 23. A light emitting tungsten filament 24 is connected to the tops of the two electrode pins 21, 22. The parts 26, 27 of the electrode pins 21, 22 are extended out of the bottom of the glass body 25 of the miniature lamp bulb 20 for connecting to a conductor pair 90. The conductor pair 90 can have two naked ends 91, 92 prepared for welding to exposed electrode pins 26, 27 on the aforesaid miniature lamp bulb 20.

The present invention provides a transparent cover 30 injection-molded of plastic, the transparent cover 30 is provided with an assembling hole 32 extending inwardly for a suitable depth from the bottom end thereof and with a diameter coincident with that of the miniature lamp bulb 20. The transparent cover 30 in such a structure can be produced and shaped of plastic in a large amount (such as 10 granules).

Figure 5:
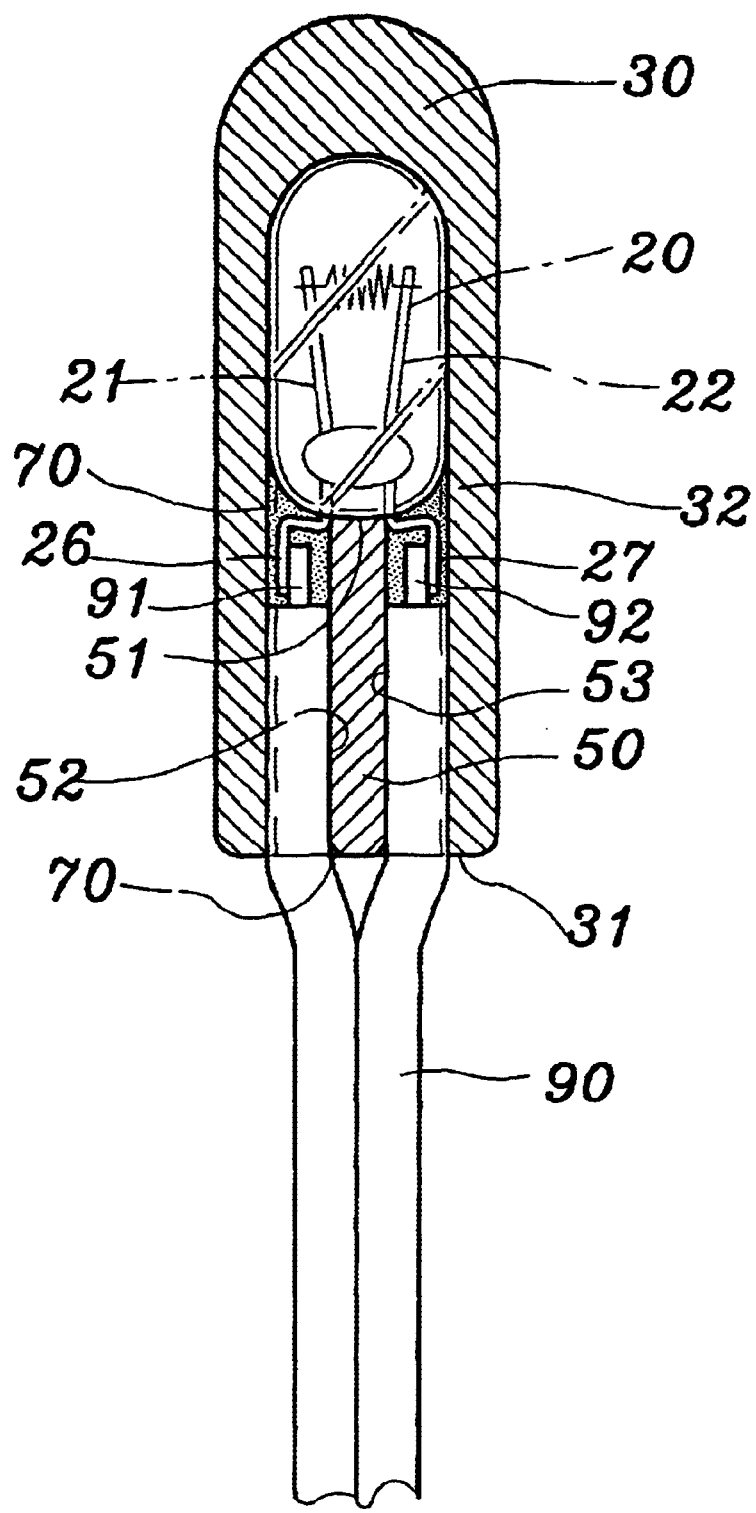
FIG. 5 is a sectional view taken from FIG. 3.

As shown in FIGS. 4 and 5, the present invention can have a positioning block 50 interposed at the joint between the exposed electrode pins of the miniature lamp bulb and the conductors, In the preferred embodiment, the positioning block 50 is provided to have a suitable longitudinal length, the top surface 51 thereof had better be in the shape coincident with that of the bottom of the glass body 25 in order to place thereon the bottom of the lamp bulb 20; both the lateral sides thereof are provided each with an axial notch 52, 53 for positioning and tightly pressing the conductor pair 90 between the axial notch 52 (53) and the inner wall of the assembling hole 32.

Figure 6D:
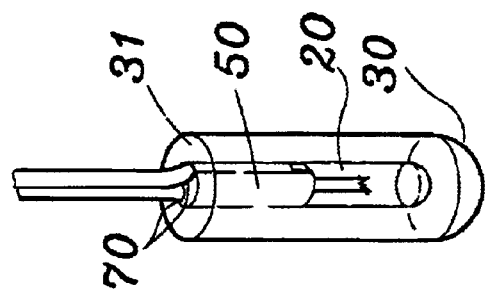
FIGS. 6A–6D show the assembling of the present invention in detail.
Figure 6C:
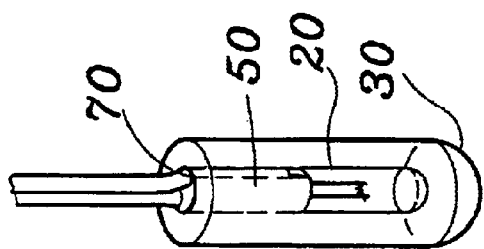
Figure 6B:
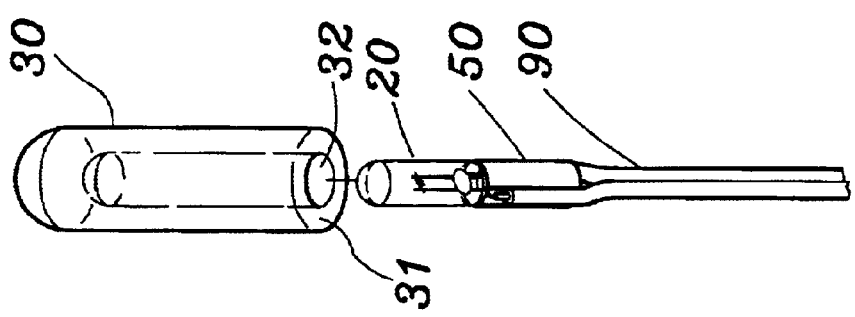
Figure 6A:
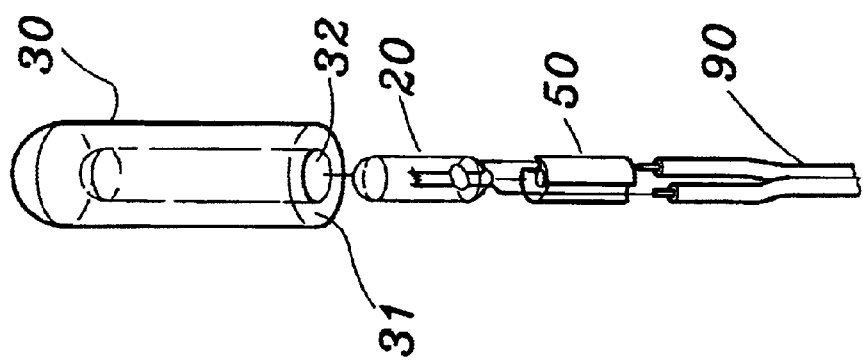

As shown in FIGS. 5 and 6A–6D, the present invention has made a transparent cover 30 by injection molding as shown in the first step shown in FIG. 6A, which transparent cover 30 is ready for slipping over other elements. Then in the second step shown in FIG. 6B, conductors have been connected and the positioning block 50 for the lamp bulb 20 are aligned with the assembling hole 32 at the bottom 31 of the transparent cover 30 and are placed into the assembling hole 32 (as shown in the third step in FIG. 6C). The bottom surface of the positioning block 50 is flush with the bottom surface of the transparent cover 30 to allow exposure of the conductors to the exterior of the assembling hole 32. Then PVC 70 is fully filled in all gaps by injection from the bottom end of the assembling hole 32 to form a fixed and leak proof structure (referring to the fourth step in FIG. 6D). Thereby, assembling of the whole fully enveloped miniature lamp bulb is completed.

Figure 7:
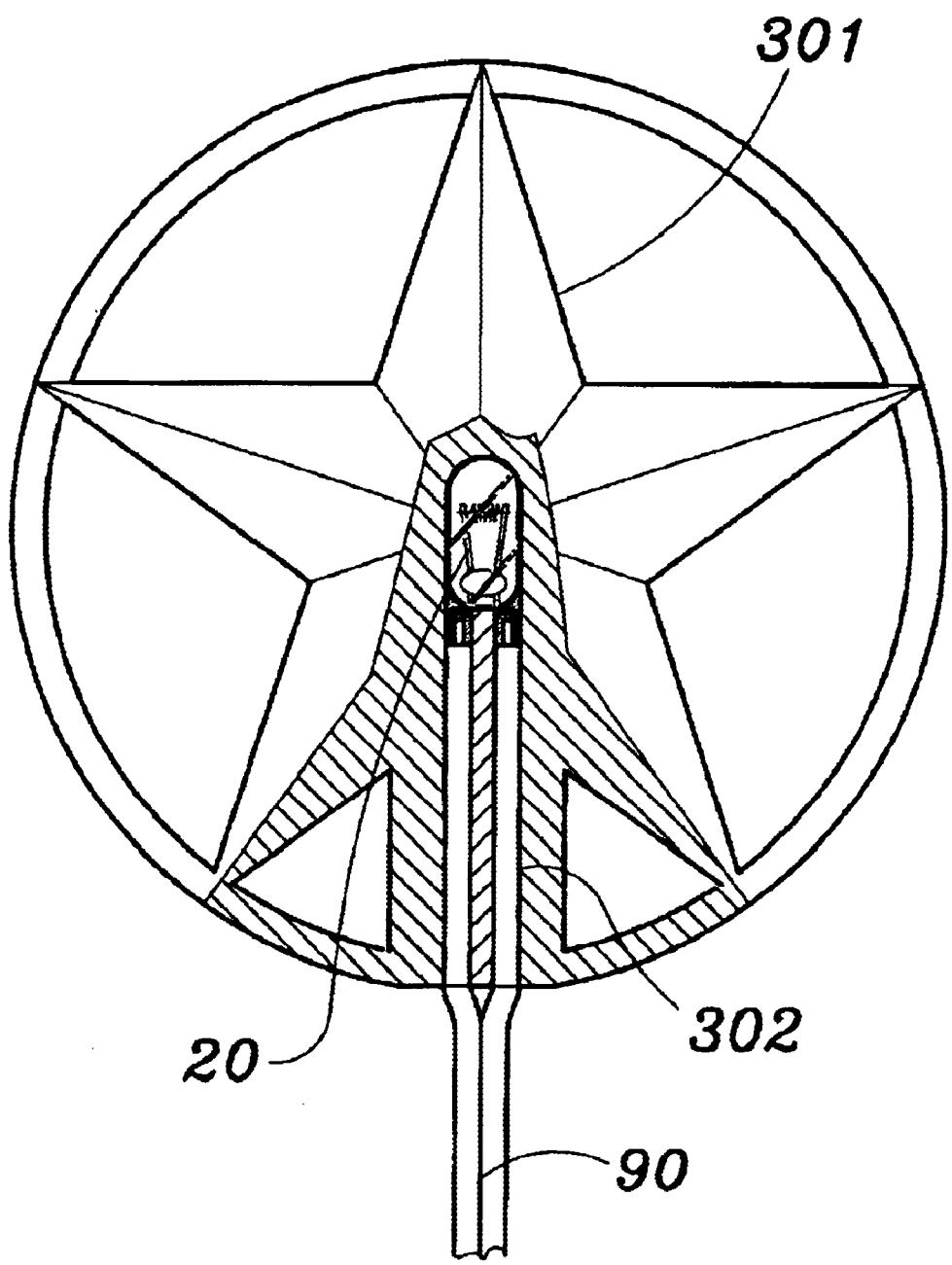
FIG. 7 is a schematic view showing a second kind of transparent cover used in the present invention.
Figure 8:
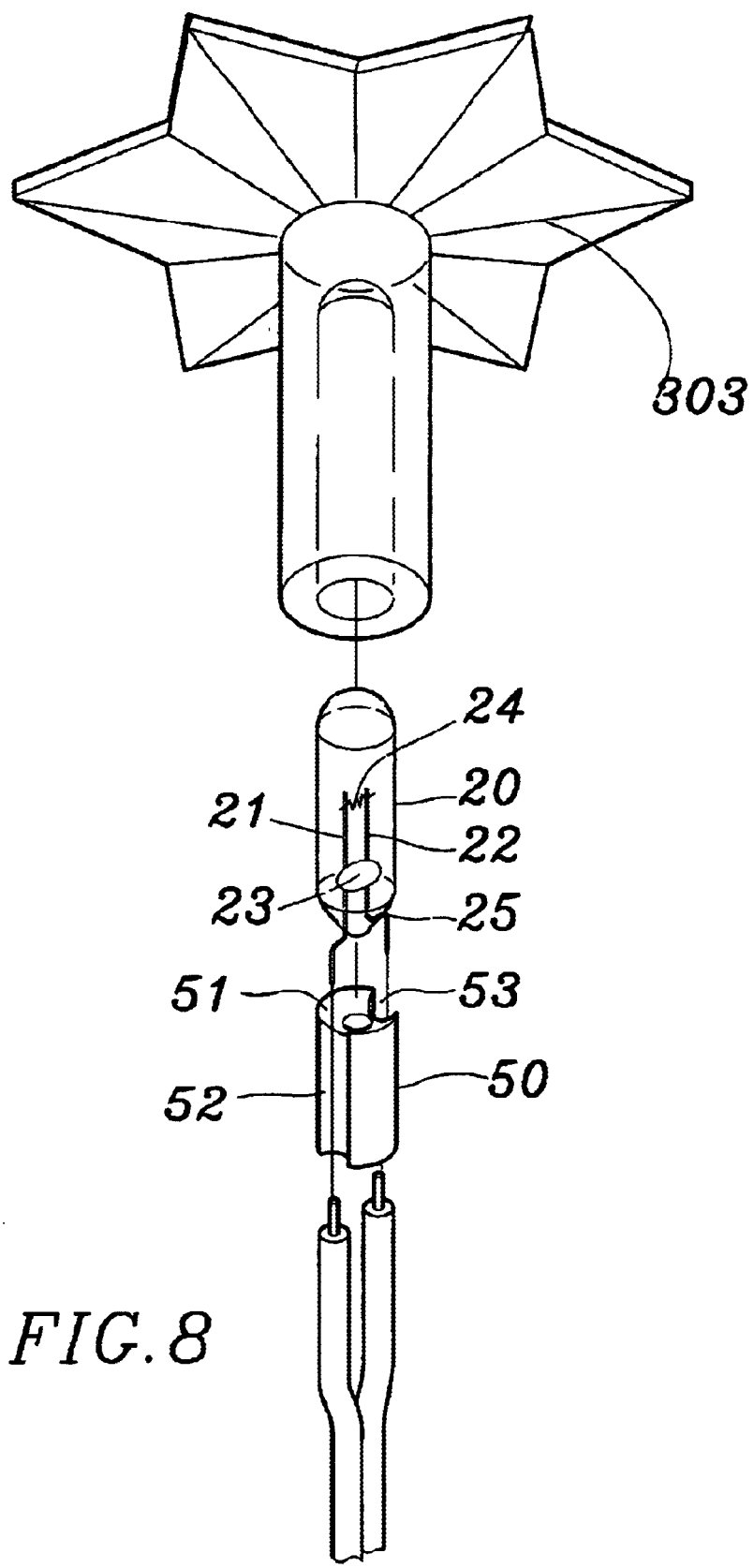
FIG. 8 is a schematic view showing a third kind of transparent cover used in the present invention.

By the fact that the transparent cover 30 of the present invention can be shaped individually in a die, it can be any of various modeling. As is shown in FIG. 7, a transparent cover 301 can be in the shape of a star, and an assembling hole 302 can also be provided on the bottom thereof, the miniature lamp bulb 20 and the decorative transparent cover 301 can also be connected to each other by the steps stated above. In this embodiment, by presetting the depth of the assembling hole 302, the miniature lamp bulb 20 capable of illuminating and flashing can be as close to the center of the decorative star as possible. FIG. 8 shows another decorative transparent cover 303 with the shape of a flower with petals. In this embodiment, the position of the lamp bulb 20 can be determined by an assembling hole to be as close to the center of the bottom of the flower as possible. These decorative transparent covers of variant modeling can be separately shaped with different dies, and manufacturers can provide such assembling holes when in processing or manufacturing various small decorative articles used on a decorative light set to be assembled to form the structure of the present invention.

Moreover, by virtue that the decorative transparent covers of variant modeling can be separately shaped with different dies, the assembling holes for positioning the lamp bulbs 20 can be provided with a light converging surface, such as, the surface providing a lot of protruding areas in order to give marvelous convergent illumination in lightening and flashing of the lamp bulbs 20.

Figure 9:
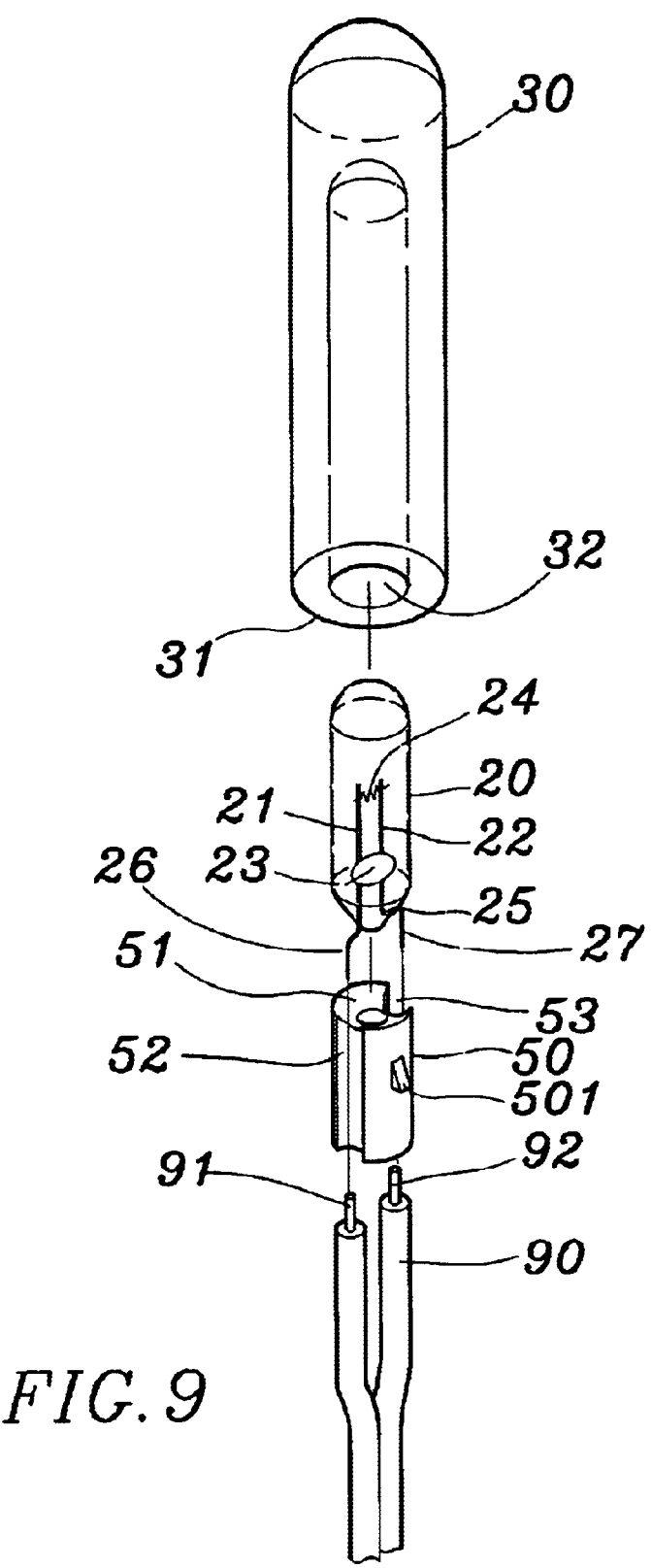
FIG. 9 shows another kind of positioning block as compare to that in FIG. 4.

In the embodiment shown in FIG. 9, the positioning block 50 is provided on the external peripheral wall thereof with one or more than one engaging pieces 501 to more firmly engage with the inner wall of the assembling hole 32.

Figure 10:
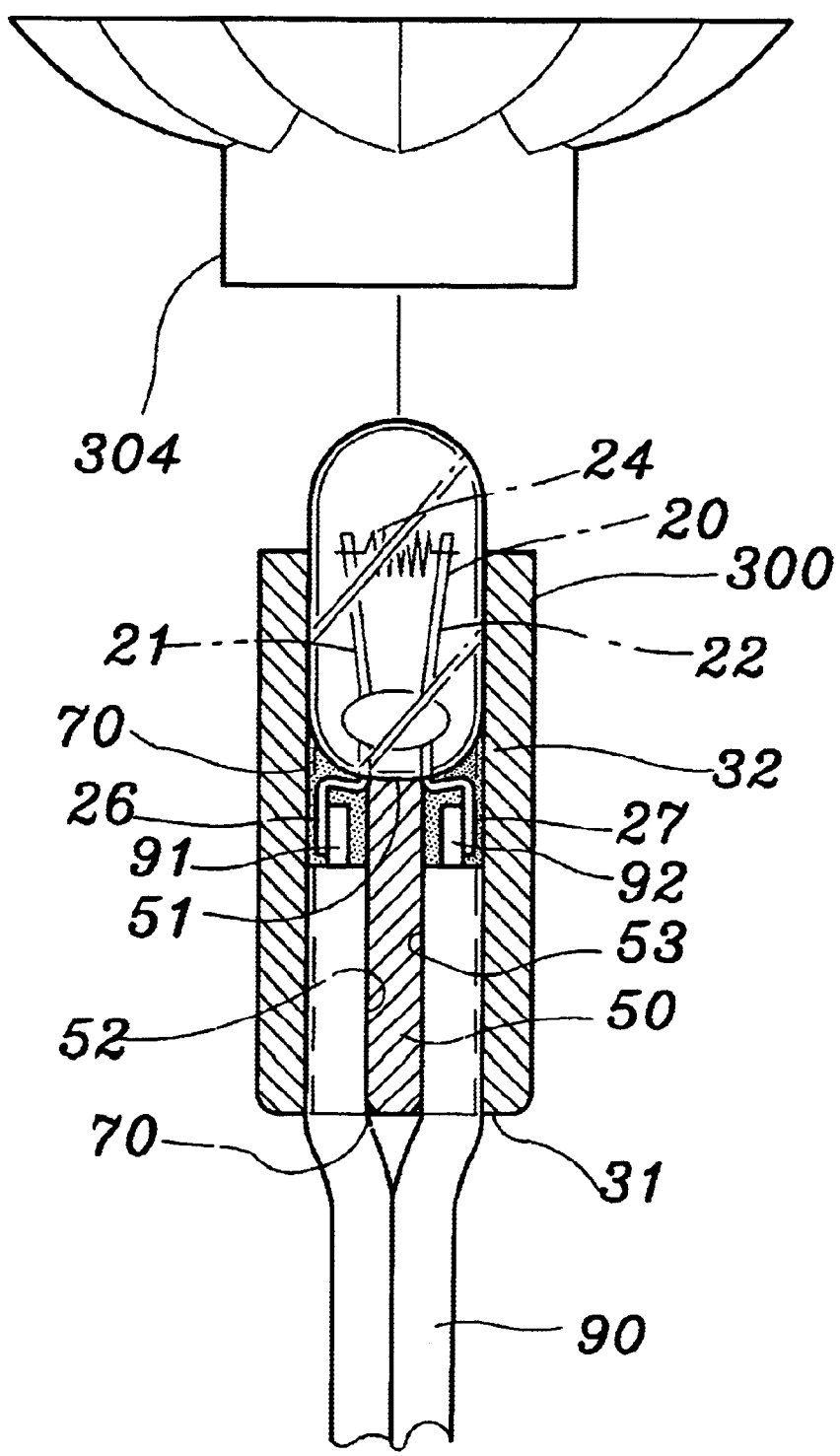
FIG. 10 shows another preferred embodiment of the present invention.

In the embodiment shown in FIG. 10, a transparent cover 30 which is hollow can allow partial exposing of a lamp bulb 20. In this preferred embodiment, the area above the tungsten filament 24 of the lamp bulb 20 is exposed out from the top of the transparent cover 30. This structure can even be suitable for mounting on the top a decorative lamp cover 304 such as in the shape of a flower or petals.

The most important advantage of the improved miniature lamp bulb of the present invention is that, transparent covers can be produced by normal mass production with faster speed and lower cost and can be in various kinds of modeling and capable of adding thereon additional decorations, thereby decorative effect thereof is varied.

The embodiments cited above are only for illustrating and specifying of the present invention. It will be apparent to those skilled in this art that various modifications or changes can be made to the elements of the present invention without departing from the spirit, scope and characteristic of this invention. Accordingly, all such modifications and changes also fall within the scope of the appended claims and are intended to form part of this invention.

What is claimed is:

1. A structure of a fully enveloped miniature lamp bulb assembly for lamp strings, comprising: a miniature lamp bulb having two electrode pins with a predetermined distance therebetween and being connected in a glass body of the miniature lamp bulb to a, light emitting tungsten filament, portions of said electrode pins extending out of a bottom of the glass body and connected to a conductor pair; and a transparent cover having a predetermined shape which is made separately from the miniature lamp bulb and having an assembling hole of a size mating with said miniature lamp bulb and extending inwardly from an end thereof; wherein said miniature lamp bulb connected with said conductors is placed in said assembling hole by a positioning block interposed at a joint between the extending portion of said electrode pins and said conductors, a bottom of said transparent cover with said assembling hole is sealed with adhesive agent to complete said assembly, and wherein an inner wall of said assembling hole on said transparent cover is provided with a light converging surface.

2. The structure of a fully enveloped miniature lamp bulb assembly for lamp strings as claimed in claim 1, wherein, said positioning block has a top surface in a shape coincident with a shape of the bottom of said glass body in order to place thereon the bottom of said lamp bulb, and both lateral sides of the positioning block each have an axial notch for positioning and tightly pressing said conductor pair between said axial notch and an inner wall of said assembling hole.

3. The structure of a fully enveloped miniature lamp bulb assembly for lamp strings as claimed in claim 2, wherein, said positioning block has a bottom surface thereof flush with a bottom surface of said transparent cover after assembling in said assembling hole.

4. The structure of a fully enveloped miniature lamp bulb assembly for lamp strings as claimed in claim 1, wherein, said positioning block is provided on an external peripheral wall thereof with at least one engaging piece to engage with an inner wall of said assembling hole.

* * * * *